US010400312B2

(12) United States Patent
Bes

(10) Patent No.: US 10,400,312 B2
(45) Date of Patent: Sep. 3, 2019

(54) LOWER WING SKIN METAL WITH IMPROVED DAMAGE TOLERANCE PROPERTIES

(71) Applicant: CONSTELLIUM ISSOIRE, Issoire (FR)

(72) Inventor: Bernard Bes, Seyssins (FR)

(73) Assignee: CONSTELLIUM ISSOIRE, Issoire (FR)

( * ) Notice: Subject to any disclaimer, the term of this patent is extended or adjusted under 35 U.S.C. 154(b) by 436 days.

(21) Appl. No.: 15/025,147

(22) PCT Filed: Sep. 26, 2014

(86) PCT No.: PCT/FR2014/000216
§ 371 (c)(1),
(2) Date: Mar. 25, 2016

(87) PCT Pub. No.: WO2015/044538
PCT Pub. Date: Apr. 2, 2015

(65) Prior Publication Data

US 2016/0237531 A1 Aug. 18, 2016

(30) Foreign Application Priority Data

Sep. 30, 2013 (FR) ..................................... 13 02273

(51) Int. Cl.

| | |
|---|---|
| ***C22C 21/14*** | (2006.01) |
| ***C22F 1/057*** | (2006.01) |
| ***C22C 21/16*** | (2006.01) |
| ***C22C 21/12*** | (2006.01) |
| ***C22F 1/04*** | (2006.01) |
| ***B64C 3/26*** | (2006.01) |
| ***B22D 21/00*** | (2006.01) |
| ***B22D 27/20*** | (2006.01) |

(52) U.S. Cl.
CPC ............ *C22C 21/16* (2013.01); *B22D 21/007* (2013.01); *B22D 27/20* (2013.01); *B64C 3/26* (2013.01); *C22C 21/12* (2013.01); *C22C 21/14* (2013.01); *C22F 1/04* (2013.01); *C22F 1/057* (2013.01)

(58) Field of Classification Search
CPC ......... C22C 21/12; C22C 21/14; C22C 21/16; C22F 1/04; C22F 1/057; B64C 3/26; B22D 21/007
See application file for complete search history.

(56) References Cited

U.S. PATENT DOCUMENTS

| | | | | |
|---|---|---|---|---|
| 2004/0099353 | A1* | 5/2004 | Benedictus ............. | C22C 21/16 148/552 |
| 2006/0065331 | A1* | 3/2006 | Bes ......................... | C22B 21/06 148/552 |

FOREIGN PATENT DOCUMENTS

| | | | |
|---|---|---|---|
| FR | 2 843 755 | A1 | 2/2004 |
| FR | 2 858 984 | A1 | 2/2005 |

* cited by examiner

*Primary Examiner* — Colleen P Dunn
*Assistant Examiner* — Anthony M Liang
(74) *Attorney, Agent, or Firm* — McBee Moore Woodward & Vanik IP, LLC

(57) ABSTRACT

The invention relates to a rolled product with state T351, having thickness of between 15 and 50 mm, made from aluminum alloy having the following composition, in % by weight, Cu: 3.85-4.15; Mg: 0.95-1.25; Mn: 0.45-0.57; Zr: 0.09-0.16; Ti: 0.005-0.1; Fe: <0.070; Si: <0.060; with Cu+Mg≤5.15; other lesser elements 0.05 each and less than 0.15 in total, the remainder being aluminum.

17 Claims, No Drawings

LOWER WING SKIN METAL WITH IMPROVED DAMAGE TOLERANCE PROPERTIES

CROSS REFERENCE TO RELATED APPLICATIONS

This application is a § 371 National Stage Application of PCT/FR2014/000216, filed Sep. 26, 2014, which claims priority to FR 1302273, filed Sep. 30, 2013.

BACKGROUND

Field of the Invention

The invention relates to aluminum-copper-magnesium alloy rolled products, and more particularly to such products, their manufacturing processes and use, intended notably for the field of aeronautical and aerospace construction.

Description of Related Art

The significant increase in fuel prices has recently led aircraft manufacturers to propose new models with reduced consumption.

In particular, new single-aisle aircraft with improved engines have been proposed. However, as the new engines used are heavier and bulkier, aircraft manufacturers are facing new mechanical stresses on the wings. In addition, airlines hope to space out complete structural overhauls and to achieve this it is necessary to further improve the fatigue properties of the materials used, particularly for the underside of the wings (lower wing skin) which is subject to tensile stressing during flight.

Alloy 2024 in the T3 temper has been a standard material for producing lower wing skins for many years owing to its high tolerance to damage. Products with equivalent damage tolerance but a higher static strength have been sought for.

Alloy 2324 in the T39 temper offers higher strength while maintaining a similar tenacity to that of alloy 2024 in the T3 temper, particularly if cold rolling of about 10% is performed.

U.S. Pat. Nos. 5,863,359 and 5,865,914 describe an alloy composed as follows (as a percentage by weight), Cu: 3.6-4.0, Mg: 1.0-1.6, Mn: 0.3-0.7, Zr: 0.05 to 0.25 for the production of lower wing skin elements. Typically the product is cold rolled by about 9% and stress-relieved with a permanent elongation of about 1% and has the following properties: TYS (TL) (TL) of at least 414 MPa and K1c (L-T) of at least 42 MPa√m.

Patent EP1026270 describes an alloy composed as follows (as a percentage by weight) Fe<0.15, Si<0.15, Cu: 3.8-4.4, Mg: 1-1.5, Mn: 0.5-0.8, Zr: 0.08-0.15. This alloy is transformed so that the rolled, extruded or forged products obtained have a ratio $UTS(L)/R_{0.2}(L)$ greater than 1.25.

U.S. Pat. No. 6,325,869 describes an extruded product substantially unrecrystallized as an alloy of composition (as a percentage by weight) Fe<0.1, Si<0.1, Cu: 3.6-4.2, Mg: 1.0-1.6, Mn: 0.3-0.8, Zr: 0.05-0.25.

Patent application FR 2 843 755 describes an Al—Cu alloy comprising (as a percentage wt. %) Cu: 3.8-4.7, Mg: 1.0-1.6, Zr: 0.06-0.18, Mn: >0-0.5, Cr<0.15, Fe≤0.15, Si≤0.15, preferably with Mn in a range from 0.20 to 0.45 wt. % or more preferably in a range from 0.25 to 0.30 wt. %.

Products requiring significant cold working, typically at about 9% cold rolling, have the drawback of having a small difference between UTS and TYS resulting in lower cold formability, poorer resistance to spectrum fatigue crack propagation under a load with a variable amplitude, representative of the life cycle of an aircraft ("spectrum fatigue") and a higher rate of residual stresses.

Known 2XXX alloy plates used in the T351 temper, i.e. having undergone solution heat-treatment, strain hardened with 1.5 to 3% permanent set and matured, i.e. aged at room temperature until a substantially stable state is obtained, do not, however, make it possible to simultaneously achieve static strength and sufficient spectrum loading fatigue properties.

Alloy 2419 in the T8 temper has also been used for the lower wing skins of military aircraft. The use of 7XXX (alloys for the production of aircraft wing lower wing skins is also known. Alloys 7178 in the T6 temper and T76 in the 7075 temper have been used for these elements in the past. Alloy 7475 in the T73 temper or alloy 7150 in the T77 temper have also been proposed. U.S. Pat. No. 5,865,911 describes an alloy comprising (as a percentage by weight %) Zn: 5.2-6.8%, Cu: 1.7-2.4%, Mg: 1.6-2.2%, Zr: 0.03 to 0.3% for the production of aircraft wing lower wing skins.

The problem to be solved by the invention is to improve the properties of AlCuMg alloy products, especially as regards the compromise between static mechanical strength, fracture toughness, crack growth under spectrum fatigue, formability and rate of residual stress.

SUMMARY

A first subject of the invention is a rolled product in the T351 temper, whose thickness is between 15 and 50 mm, made of aluminum alloy of composition, as a percentage by weight, Cu: 3.85-4.15
Mg: 0.95-1.25
Mn: 0.45-0.57
Zr: 0.09-0.16
Ti: 0.005-0.1
Fe: <0.070
Si: <0.060
with Cu+Mg≤5.15 other elements <0.05 each and less than 0.15 in total, the remainder being aluminum.

A second subject of the invention is a manufacturing process for a rolled product according to the invention in which,

- an alloy of the composition of the invention is prepared and cast, adding a grain-refining agent of the AlTiB or AlTiC type to obtain a rolling slab,
- said slab is optionally homogenized at a temperature between 480° C. and 510° C.,
- said optionally homogenized rolling slab is hot-rolled to obtain a plate of thickness e between 15 and 50 mm,
- said plate is solution heat treated at a temperature between 480 and 505° C. for a time t in hours such that t≥e/7.
- said solution heat treated plate is quenched,
- said quenched plate undergoes cold stretching with a deformation of between 1.5 and 3%,
- natural aging at room temperature is carried out.

Yet another object of the invention is an aircraft wing lower wing skin element including a plate according to the invention.

DETAILED DESCRIPTION OF A PREFERRED EMBODIMENT

Unless otherwise stated, all the indications concerning the chemical composition of the alloys are expressed as a percentage by weight based on the total weight of the alloy. The expression 1.4 Cu means that the copper content, expressed as a percentage by weight is multiplied by 1.4. The designation of alloys is compliant with the rules of The Aluminum Association (AA), known to those skilled in the art. Unless otherwise specified, the definitions of metallurgical states listed in European Standard EN 515 apply.

The static mechanical properties under stretching, in other words the ultimate tensile strength UTS, the conventional yield strength at 0.2% offset (TYS) and elongation at break A %, are determined by a tensile test according to standard EN ISO 6892-1, and sampling and test direction being defined by standard EN 485-1. Within the framework of the invention, the mechanical properties are measured at half thickness of the plates. Unless otherwise specified, the definitions of standard EN 12258 apply. Fracture toughness is measured according to standard ASTM E399.

The present inventors found that it is possible to significantly improve the compromise between static mechanical strength, crack propagation under spectrum fatigue, formability and the rate of residual stresses by means of rolled products in the T351 temper made from 2 XXX alloy with a carefully selected composition. The invention relates to plate whose thickness is between 15 and 50 mm and preferably between 20 and 40 mm. The present inventors have in particular found that by selecting a copper content of between 3.85 and 4.15 wt. % and preferably between 3.90 and 4.10 wt. %, a magnesium content of between 0.95 and 1.25 wt. % and preferably between 0.96 and 1.15 wt. % and most preferably between 0.98 and 1.10 wt. %, with the further condition that Cu+Mg≤5.15 and preferably Cu+Mg≤5.05, it is possible to improve the fatigue properties under spectrum loading while maintaining sufficient static mechanical strength. The manganese content of the alloy according to the invention is between 0.45 and 0.57 wt. % and preferably between 0.48 and 0.55 wt. %. In one embodiment of the invention, the manganese content is at least 0.51 wt. % and preferably at least 0.54 wt. %. The titanium content of the alloy according to the invention is between 0.005 and 0.1 wt. % and preferably between 0.010 and 0.05 wt. %. The zirconium content of the alloy according to the invention is between 0.09 and 0.16 wt. % and preferably between 0.10 and 0.15 wt. %. Surprisingly it is more efficient to select according to the invention the copper, magnesium, manganese, titanium and zirconium contents to improve the compromise than to reduce the iron and silicon content. The silicon content is therefore less than 0.060 wt. % and preferably less than 0.040 wt. % but a content of less than 0.020 wt. % is not necessary. In one embodiment of the invention a silicon content of at least 0.020 wt. % is tolerated, which reduces the cost of the alloy. Similarly the iron content is less than 0.070 wt. % and preferably less than 0.060 wt. % but a content of less than 0.030 wt. % is not necessary. In one embodiment of the invention an iron content of at least 0.030 wt. % is tolerated, which reduces the cost of the alloy.

The other elements each have a content of less than 0.05 wt. %, and preferably less than 0.03% each and 0.15 wt. % in total and preferably less than 0.10 wt. % in total. The rest is aluminum. The products according to the invention are obtained by a method wherein firstly an alloy of composition according to the invention is prepared and cast, adding an AlTiB or AlTiC type grain-refining agent to obtain a rolling slab.

An AlTiB grain-refining agent means, within the scope of the present invention, an aluminum alloy including between 1 and 10% titanium, and between 0.5 and 5% boron, the typically used products, known under the reference AT3B and AT5B, include 3% and 5% of titanium respectively and 1% of boron. An AlTiC grain-refining agent means, within the scope of the present invention, an aluminum alloy including between 1 and 10% titanium, and between 0.01 and 1% carbon, the typically used products, known under the reference AT3C0.15 and AT6C0.02 include 3% of titanium and 0.15% of carbon and 6% of titanium and 0.02% of carbon respectively. These products can be added into the furnace or into a trough by means of a wire during casting. The present inventors found that the addition of an AlTiC type grain-refining agent is advantageous because it gives products with further improved fatigue properties under spectrum loading. Optionally, said slab is homogenized at a temperature between 480° C. and 510° C., and preferably between 490 and 508° C.

The optionally homogenized rolling slab is hot rolled to obtain a plate of thickness e, expressed in mm, between 15 and 50 mm. Advantageously, the average temperature during hot rolling to thickness 60 mm, i.e., the average temperature of each hot rolling pass to thickness 60 mm, is at least 450° C. As the outgoing hot rolling temperature may also influence the mechanical properties, the outgoing hot rolling temperature is advantageously at least 410° C.

Said plate undergoes solution hardening at a temperature between 480 and 505° C. for a time t expressed in hours such that t≥e/7, where e is the thickness of the plate expressed in mm. So for a thickness of 15 mm the time must be at least 2.1 hours and for a time of 50 mm the time must be at least 7.1 hours. The present inventors found that, surprisingly, too high a solution heat-treatment time can be harmful to fatigue performance under spectrum loading and/or to static mechanical strength, whereas it might have been imagined that it would have made it possible to further improve the solution heat-treatment and therefore mechanical performance. Advantageously, the solution heat-treatment is performed at a temperature of at least 495° C. said time t expressed in hours being such that t≤e/t≤4.5 and preferably t≤e/5.0 and most preferably t≤e/5.5 where e is the thickness of the plate expressed in mm. The solution heat-treated plate is subsequently quenched, typically by immersion or spraying with cold water. Said quenched plate undergoes cold stretching with a deformation of between 1.5 and 3% of permanent set. Finally, natural aging at room temperature is performed to obtain a substantially stable condition for a T351 temper.

Given the conditions of the transformations used, the resulting plate has a ratio between the ultimate tensile strength UTS in direction L and the conventional yield strength at 0.2% elongation TYS in direction L greater than 1.25 and preferably greater than 1.30. The conventional yield strength at 0.2% elongation TYS in direction L is advantageously at least 350 MPa, and preferably at least 365 MPa. The plates obtained by the process according to the invention exhibit in particular an advantageous compromise between static mechanical strength, fracture toughness and fatigue crack growth under spectrum loading.

Aircraft wing lower wing skin elements comprising a plate according to the invention are advantageous.

EXAMPLES

Example 1: Plates of Thickness 35 mm

In this example, rolling slabs were cast. The composition of the slabs and type of grain-refining agent used are given in Table 1. Plates 8 to 14 have a composition according to the invention.

TABLE 1

| Characteristics of cast slabs. The compositions are given as a percentage by weight. | | | | | | | | | |
|---|---|---|---|---|---|---|---|---|---|
| Test | Grain-refining agent | Si | Fe | Cu | Mn | Mg | Cu + Mg | Ti | Zr |
| 1 | AT5B | 0.040 | 0.075 | 4.21 | 0.63 | 1.29 | 5.50 | 0.013 | 0.098 |
| 2 | AT3C0, 15 | 0.053 | 0.094 | 4.15 | 0.55 | 1.27 | 5.42 | 0.022 | 0.117 |
| 3 | AT5B | 0.023 | 0.029 | 4.08 | 0.57 | 1.16 | 5.24 | 0.021 | 0.106 |
| 4 | AT5B | 0.054 | 0.079 | 4.06 | 0.56 | 1.27 | 5.33 | 0.013 | 0.115 |
| 5 | AT3C0, 15 | 0.031 | 0.040 | 4.10 | 0.66 | 1.29 | 5.39 | 0.024 | 0.103 |
| 6 | AT3C0, 15 | 0.033 | 0.050 | 4.00 | 0.56 | 1.24 | 5.24 | 0.028 | 0.092 |
| 7 | AT3C0, 15 | 0.018 | 0.039 | 4.06 | 0.61 | 1.31 | 5.37 | 0.005 | 0.098 |
| 8 | AT3C0, 15 | 0.025 | 0.033 | 3.97 | 0.55 | 1.07 | 5.04 | 0.021 | 0.114 |
| 9 | AT5B | 0.026 | 0.063 | 4.01 | 0.54 | 1.05 | 5.06 | 0.022 | 0.106 |
| 10 | AT5B | 0.029 | 0.045 | 3.97 | 0.51 | 1.08 | 5.05 | 0.020 | 0.120 |
| 11 | AT5B | 0.026 | 0.063 | 4.01 | 0.54 | 1.05 | 5.06 | 0.022 | 0.106 |
| 12 | AT3C0, 15 | 0.024 | 0.028 | 4.03 | 0.57 | 1.09 | 5.12 | 0.023 | 0.108 |
| 13 | AT3C0, 15 | 0.025 | 0.033 | 3.97 | 0.55 | 1.07 | 5.04 | 0.021 | 0.114 |
| 14 | AT3C0, 15 | 0.030 | 0.044 | 3.94 | 0.52 | 0.99 | 4.93 | 0.020 | 0.118 |

The slabs were hot-rolled to a thickness of between 35 and 37 mm and then solution heat-treated at a temperature of 497° C., then quenched. All the plates underwent controlled stretching with a permanent elongation of 2.2% and were then naturally aged at room temperature to obtain a T351 temper. The working conditions are given in Table 2. The solution heat-treatment times of tests 3, 8 and 9 were significantly higher than those of the other tests.

TABLE 2

| Slab working conditions | | | | |
|---|---|---|---|---|
| Test | Average hot rolling temperature to thickness 60 mm (° C.) | Hot rolling output temperature (° C.) | Final thickness (mm) | Solution heat treatment time (h) |
| 1 | 442 | 404 | 36.7 | 6 |
| 2 | 449 | na | 35.5 | 6 |
| 3 | 460 | 449 | 36 | 9.3 |
| 4 | 431 | na | 35.5 | 6 |
| 5 | 456 | 421 | 35.6 | 6 |
| 6 | 458 | 420 | 35.6 | 6 |
| 7 | na | 450 | 36 | 6 |
| 8 | 459 | 441 | 36 | 9.3 |
| 9 | 457 | 408 | 36 | 9.6 |
| 10 | 461 | 435 | 35 | 5.1 |
| 11 | 455 | 419 | 35 | 6.7 |
| 12 | 455 | 431 | 35 | 7 |
| 13 | 454 | 429 | 35 | 6 |
| 14 | na | 452 | 35 | 5.8 |

na: not available

The static mechanical characteristics of the plates were measured in the L and TL directions, as well as the fracture toughness on test pieces of width 76 mm and thickness B=2 mm, in the T-L direction and in the L-T direction. The static mechanical properties and fracture toughness were measured at mid-thickness. In addition, fatigue was measured under spectrum loading representative of the lower wing skin conditions of a commercial aircraft according to the specifications of an aircraft manufacturer on CCT type test pieces, 12 mm thick, 700 mm long and 200 mm wide, having a notch of 30 mm. The test pieces for characterizing spectrum fatigue were taken so as to be centered 11 mm below the surface of the plate. The spectrum fatigue results were obtained after fatigue pre-cracking until this crack reached 40 mm. The result is the number of flights between 50 mm and 130 mm of crack growth.

The results obtained are given in table 3.

TABLE 3

| Mechanical characteristics measured | | | | | | | | | |
|---|---|---|---|---|---|---|---|---|---|
| Test | UTS L (MPa) | TYS (MPa) | A % L | UTS TL (MPa) | TYS TL (MPa) | A % TL | Spectrum fatigue (number of flights) | Kq W76 L-T (MPa√m) | Kq W76 T-L (MPa√m) |
| 1 | 500 | 383 | 15.6 | 467 | 331 | 16.6 | 4211 | | |
| 2 | 509 | 380 | 15.6 | 475 | 335 | 16.6 | 4293 | | |
| 3 | 500 | 379 | 16.3 | 474 | 336 | 18.3 | 4730 | 58.8 | 49.5 |
| 4 | 501 | 372 | 16.6 | 468 | 327 | 18.7 | 4940 | | |
| 5 | 524 | 413 | 15.5 | 493 | 369 | 17.9 | 4958 | 58.6 | 47.7 |
| 6 | 512 | 398 | 16.8 | 486 | 350 | 18.7 | 5001 | 57.7 | 49.0 |
| 7 | 520 | 399 | 14.9 | 488 | 352 | 17.6 | 5157 | 59.7 | 49.8 |
| 8 | 502 | 383 | 16.9 | 478 | 339 | 19.6 | 5183 | 60.6 | 52.3 |
| 9 | 482 | 357 | 16.8 | 462 | 323 | 18.6 | 5334 | 59.3 | 51.2 |
| 10 | 504 | 390 | 16.3 | 475 | 345 | 18.7 | 5437 | 62 | 59 |
| 11 | 486 | 371 | 16.2 | 464 | 329 | 18.4 | 5459 | 57.0 | 50.2 |
| 12 | 503 | 389 | 16.4 | 474 | 343 | 19.0 | 5516 | 61 | 54 |
| 13 | 492 | 374 | 15.8 | 465 | 331 | 18.0 | 5650 | 58.8 | 56.1 |
| 14 | 490 | 376 | 15.8 | 463 | 333 | 18.6 | 5676 | 59 | 50 |

With the composition according to the invention a number of flights of at least 5183 is always obtained. The number of flights obtained for sample 7 is lower despite a very low silicon and iron content. In this way, the composition according to the invention gives satisfactory performance in terms of spectrum fatigue without using a very low iron and silicon content, and for compositions outside the invention with Cu, Mg and Mn a very a very low iron and silicon content does not give a sufficient performance in terms of fatigue. It is also to be noted, in particular by comparing samples 8 and 13 or 9 and 11, that too high a solution heat treatment time is unfavorable for fatigue performance under spectrum loading. The best results for spectrum fatigue are obtained with the combination of a composition according to the invention of, a type AlTiC grain refining agent and a solution heat treatment time less than or equal to the thickness divided by 4.5.

Example 2: Plates of Thickness 25 mm

In this example, rolling slabs were cast. The composition of the slabs and type of grain-refining agent used are given in Table 4.

Plates 17 to 19 have a composition according to the invention.

TABLE 4

Characteristics of the slabs cast. The compositions are given as percentages by weight.

| Test | Grain-refining | Si | Fe | Cu | Mn | Mg | Cu + Mg | Ti | Zr |
|---|---|---|---|---|---|---|---|---|---|
| 15 | AT5B | 0.035 | 0.075 | 4.11 | 0.61 | 1.24 | 5.35 | 0.016 | 0.093 |
| 16 | AT5B | 0.040 | 0.075 | 4.21 | 0.63 | 1.29 | 5.50 | 0.013 | 0.098 |
| 17 | AT5B | 0.026 | 0.063 | 4.01 | 0.54 | 1.06 | 5.07 | 0.022 | 0.106 |
| 18 | AT5B | 0.026 | 0.063 | 4.01 | 0.54 | 1.05 | 5.06 | 0.022 | 0.106 |
| 19 | AT3C0, 15 | 0.025 | 0.033 | 3.97 | 0.55 | 1.07 | 5.04 | 0.021 | 0.114 |

The plates were hot-rolled to a thickness of 25 mm and then solution heat-treated at a temperature of 497° C., then quenched. All the plates underwent controlled stretching with a permanent elongation of 2.2% and were then naturally aged at room temperature to obtain a T351 temper. The working conditions are given in Table 5.

TABLE 5

| Slab working conditions | | | |
|---|---|---|---|
| Test | Average hot rolling temperature to thickness 60 mm | Hot rolling output temperature | Solution heat treatment time (h) |
| 15 | 423 | 363 | 6 |
| 16 | 436 | 379 | 6 |
| 17 | 453.1 | 427.0 | 6.6 |
| 18 | 454.6 | 405.0 | 4.2 |
| 19 | 453.5 | 420.0 | 5.6 |

The static mechanical characteristics of the plates were measured in the L and TL directions, as well as the fracture toughness on test pieces of width 76 mm in the T-L direction and in the L-T direction. The static mechanical properties and fracture toughness were measured at mid-thickness. In addition, fatigue was measured under spectrum loading representative of the lower wing skin conditions of a commercial aircraft according to the specifications of an aircraft manufacturer on CCT type test pieces, 12 mm thick, 700 mm long and 200 mm wide, having a notch of 30 mm. The test pieces for characterizing spectrum fatigue were taken so as to be centered at mid-thickness of the plate. The spectrum fatigue results were obtained after fatigue pre-cracking until this crack reached 40 mm. The result is the number of flights between 50 mm and 130 mm of crack growth.

The results obtained are given in table 6.

TABLE 6

| Mechanical characteristics measured | | | | | | | | | |
|---|---|---|---|---|---|---|---|---|---|
| Test | UTS L (MPa) | TYS L (MPa) | A % L | UTS TL (MPa) | TYS TL (MPa) | A % TL | Spectrum fatigue (number of flights) | Kq W76 L-T (MPa√m) | Kq W76 T-L (MPa√m) |
| 15 | 493 | 366 | 19.2 | 482 | 332 | 19.5 | 5124 | | |
| 16 | 504 | 378 | 18.5 | 488 | 341 | 18.4 | 5293 | | |
| 17 | 486 | 366 | 16.9 | 470 | 329 | 18.9 | 5718 | 54.0 | 50.3 |
| 18 | 488 | 373 | 17.0 | 469 | 334 | 17.9 | 5910 | 52.7 | 49.0 |
| 19 | 497 | 382 | 17.1 | 474 | 340 | 19.3 | 6348 | 55.0 | 52.5 |

For this thickness, a number of flights of at least 5718 with the composition according to the invention is always obtained. It is also to be noted, as for thickness 35 mm, in particular by comparing samples 17 and 18, that too high a solution heat treatment time is unfavorable for fatigue performance under spectrum loading. The best results for spectrum fatigue are obtained with the combination of a composition according to the invention of, a type AlTiC grain refining agent and a solution heat treatment time less than or equal to 5.6 hours.

The invention claimed is:

1. A rolled product in a T351 temper, having a thickness e of 25 or 35 mm, made of an aluminum alloy of a composition comprising, as a percentage by weight, Cu: 3.85-4.15

Mg: 0.95-1.25

Mn: 0.52-0.57

Zr: 0.09-0.16

Ti: 0.005-0.1

Fe: <0.070

Si: <0.060 with Cu+Mg≤5.15 other elements <0.05 each and less than 0.15 in total, the remainder being aluminum, wherein the rolled product further comprises an AlTiC type grain refining agent, wherein the rolled product has been solution heat treated at a temperature between 495 and 505° C. for a time t in hours such that t≥e/7 and t≤e/4.5, and wherein said rolled product has a spectrum fatigue number of flights of at least 5516 for e=35 mm and of at least 6348 for e=25 mm.

2. The product according to claim 1 wherein Fe content is 0.030-0.060 as a percentage by weight and/or Si content is 0.020-0.040 as a percentage by weight.

3. The product according to claim 1 wherein, as a percentage by weight, Mn content is 0.54-0.55.

4. The product according to claim 1 wherein as a percentage by weight, Mg content is 0.96-1.15.

5. The product according to claim 1 wherein as a percentage by weight, Cu+Mg≤5.05.

6. The product according to claim 1 having a ratio UTS(L)/TYS(L)>1.25.

7. A manufacturing process for a rolled product according to claim 1 comprising preparing and casting an alloy of the composition of claim 1, adding a grain-refining agent of an AlTiC type to obtain a rolling slab, optionally homogenizing said slab at a temperature between 480° C. and 510° C., hot-rolling said slab to obtain a plate of thickness e of 25 or 35 mm, solution heat treating said plate at a temperature between 480495 and 505° C. for a time t in hours such that t≥e/7 and t≤e/4.5, quenching said solution heat treated plate, cold stretching said quenched plate with a deformation of between 1.5 and 3%, carrying out natural aging at room temperature.

8. An aircraft lower wing skin element comprising a plate comprising a rolled product according to claim 1.

9. The product according to claim 1 comprising, as a percentage by weight, Cu: 3.90-4.10;

Mg: 0.98-1.10;

Mn: 0.52-0.57;

Zr: 0.10-0.15;

Ti: 0.010-0.05;

Fe: <0.070;

Si: <0.040;

with Cu+Mg≤5.15;

other elements <0.03 each and less than 0.10 in total, the remainder being aluminum.

10. The method according to claim 7, wherein the slab is homogenized at a temperature in a range from 490-508° C.

11. The product according to claim 1 having a ratio UTS(L)/TYS(L)>1.30.

12. The product according to claim 1 having TYS(L) at 0.2% elongation is at least 350 MPa.

13. The rolled product according to claim 1, wherein the AlTiC type grain refining agent is AT3C0.15.

14. The rolled product according to claim 1, wherein the composition consists essentially of, as a percentage by weight, Cu: 3.85-4.15

Mg: 0.95-1.25

Mn: 0.52-0.57

Zr: 0.09-0.16

Ti: 0.005-0.1

Fe: <0.070

Si: <0.060 with Cu+Mg≤5.15 other elements <0.05 each and less than 0.15 in total, the remainder being aluminum.

15. The rolled product according to claim 1, wherein the composition consists of, as a percentage by weight, Cu: 3.85-4.15

Mg: 0.95-1.25

Mn: 0.52-0.57

Zr: 0.09-0.16

Ti: 0.005-0.1

Fe: <0.070

Si: <0.060 with Cu+Mg≤5.15 other elements <0.05 each and less than 0.15 in total, the remainder being aluminum.

16. The product according to claim 15 having a ratio UTS(L)/TYS(L)>1.30.

17. The product according to claim 16 having TYS(L) at 0.2% elongation is at least 350 MPa.

* * * * *